G. STEVENSON.
Sugar Evaporator with Automatic Feeder.
No. 40,579. Patented Nov. 10, 1863.
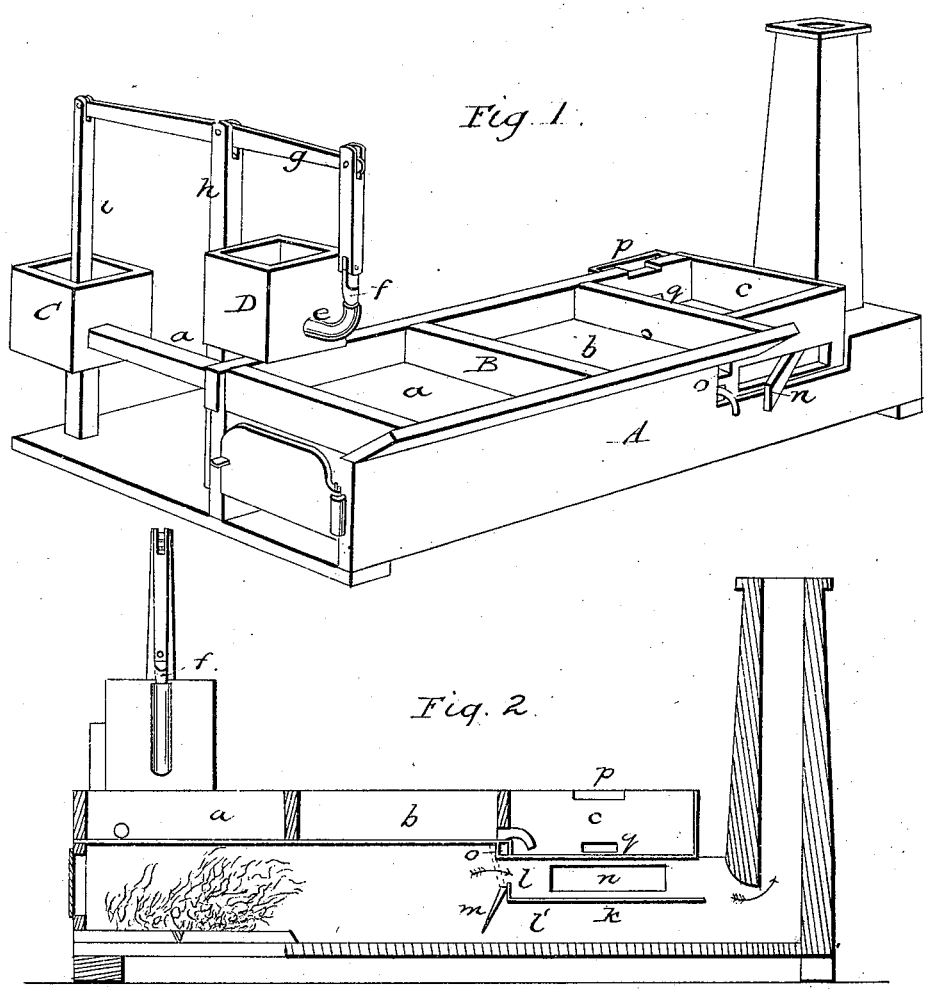

UNITED STATES PATENT OFFICE.

GEORGE STEVENSON, OF ZIONSVILLE, INDIANA.

IMPROVED SUGAR-EVAPORATOR WITH AUTOMATIC FEEDER.

Specification forming part of Letters Patent No. 40,579, dated November 10, 1863.

*To all whom it may concern:*

Be it known that I, GEORGE STEVENSON, of Zionsville, in the county of Boone and State of Indiana, have invented a new and useful Improvement in Evaporators; and I do hereby declare the following to be a full, clear, and exact description thereof, reference being had to the accompanying drawings, and to the letters of reference marked thereon, making part of this specification.

In evaporating cane-juice it is common to admit the cold juice in a constant stream at one end of a pan and allow the concentrated or partly concentrated sirup to flow out in a constant stream at a remote part of the pan. In this process it is regarded as important to admit only a sufficient quantity to maintain a thin or shallow stratum of juice, and much care and attention are required to preserve a regular uniform depth or body of juice in the evaporator. If the quantity be too great, the evaporation of boiling is prolonged, and the results are not so favorable, and if the depth of juice be too thin the metal bottom becomes unduly heated and the juice or sirup is burned.

One part of my invention refers to a device for regulating the admission of juice to the pan, the arrangement being such that a uniform depth of juice is maintained in the pan by a self-regulated supply, as will appear.

My invention also relates to an arrangement of dampers, flues, and air-chambers; also, to device for receiving the overflow of a boiling-pan and conducting the juice or sirup which escapes over the side in the state of foam back into the pan.

In the accompanying drawings, Figure 1 is a perspective view of a pan, furnace, &c., in which my improvements are represented. Fig. 2 is a longitudinal sectional elevation of the same.

Like letters of reference indicate like parts in the two figures.

A is a furnace surmounted by a pan or evaporator, B, the latter consisting of three divisions, designated, respectively, *a b c*.

C is a vessel for juice, connected with division *a* by a horizontal tube, *d*.

D is a juice-tank supported above the level of pan B.

*e* is a spout from tank D, discharging into division *a*. The outer end of *e* is bent upward, as represented, and receives a loose plug, *f*. *g* is a horizontal vibrating bar pivoted to the standard *h*, and free to vibrate vertically. One end of *g* carries the plug *f*, and the opposite end a float, *i*, which rests on the surface of the juice in the vessel C, the juice therein being maintained by its connecting-tube *d* at the same level with juice in the division *a* of the pan. The arrangement of these parts is such that as the juice in the pan, and consequently in the vessel C, is lowered the float *i* descends and the loose plug *f* is raised from the spout *e*, allowing the juice from tank D to flow into the pan; but as the juice in the pan is increased the float is elevated, the plug returned into the spout, and the flow of juice diminished. By regulating or adjusting the position of these parts relatively to any required depth of juice in the pan, they will operate to preserve the same at a uniform depth, so long as a supply is kept in the tank D.

*k* is a horizontal plate dividing the flue under division *c*, forming two passages, *l l'*, for the heated currents.

*m* is a damper so arranged with reference to the above passages that the heated currents may be conducted through in contact with the bottom of division *c*, or downward under plate *k*, and away from contact with the pan.

*n* is a door—one upon each side of the furnace—opening into the division *e* for the admission of cold air.

The division *c* of the pan is dropped a few inches below the level of the other parts of the pan. Extending across the furnace, along the front end of this division, is an open air-chamber or flue, *o*, which prevents the direct contact of the heat with the end thereof. When the division *c* of the pan is to be emptied for the purpose of cleaning or suspending operations in this part of the apparatus for the time, the damper *m* is set to conduct the heated currents under the plate *k*, and the side doors, *n*, are opened, admitting cold air, so that the bottom of the pan is kept cool.

*p* is a chamber joined to the side of division *c*, and connected therewith by an opening, *q*. The upper edge of the side of *c* is notched down sufficiently to draw the foam which may be produced in *c* by excessive heat over into the side chamber, p, and thus prevent it from overflowing other parts of the pan. The side chamber, p, is made of thin sheet metal, which readily parts with its heat, and the bubbles of steam, which constitute the foam, are suddenly burst, and the sirup suspended by them falls to the bottom of the chamber, and returns through the opening q into the pan.

In reference to regulating the supply of juice by means of a float rising and and falling with the juice in the evaporator, it is obvious that various modes may be employed which would operate with the same facility as that herein described. I do not, therefore, restrict myself to the precise device herein specified; but

What I claim as my invention, and desire to secure by Letters Patent, is the following:

1. Regulating the flow of juice to the evaporating-pan B by means of the float i, when so arranged as to rise and fall by the action of the juice in the pan, and by its operation control the admission of juice thereto, substantially in the manner and for the purpose herein described.

2. In combination with the division c of the evaporator B, set below the level of the other part or parts, as herein described, the combination and arrangement of the damper m, plate k, flues l l', air-chamber o, and side doors, n, substantially as herein shown and described.

3. In combination with the pan B, or division thereof, c, the thin metal side chamber, p, constructed and arranged in connection therewith, substantially in the manner and for the purpose described.

GEORGE STEVENSON.

Witnesses:
J. BOYD ELLIOTT,
A. B. FOOTE.